(12) United States Patent
Sakakibara

(10) Patent No.: US 7,021,073 B2
(45) Date of Patent: Apr. 4, 2006

(54) HEAT PUMP HOT WATER SUPPLY SYSTEM OF HOT WATER STORAGE TYPE

(75) Inventor: Hisayoshi Sakakibara, Nishio (JP)

(73) Assignee: DENSO Corporation, Kariya (JP)

( * ) Notice: Subject to any disclaimer, the term of this patent is extended or adjusted under 35 U.S.C. 154(b) by 71 days.

(21) Appl. No.: 10/901,470

(22) Filed: Jul. 28, 2004

(65) Prior Publication Data

US 2005/0022542 A1   Feb. 3, 2005

(30) Foreign Application Priority Data

Jul. 30, 2003   (JP)   ............. 2003-283138

(51) Int. Cl.
*F25B 27/00*   (2006.01)

(52) U.S. Cl. .............. 62/238.7; 62/324.1; 165/240; 237/2 B

(58) Field of Classification Search ............ 62/201, 62/183, 238.1, 132, 238.6, 434, 238.7, 211, 62/324.1, 51; 165/236, 240; 237/2 A, 2 B; 417/207, 208
See application file for complete search history.

(56) References Cited

U.S. PATENT DOCUMENTS

| | | | | |
|---|---|---|---|---|
| 4,363,221 A | * | 12/1982 | Singh | ............... 62/238.6 |
| 4,693,089 A | * | 9/1987 | Bourne et al. | ............... 62/79 |
| 4,796,437 A | * | 1/1989 | James | ............... 62/79 |
| 5,050,394 A | * | 9/1991 | Dudley et al. | ............... 62/115 |
| 5,946,927 A | * | 9/1999 | Dieckmann et al. | ............... 62/238.6 |
| 6,370,896 B1 | * | 4/2002 | Sakakibara et al. | ............... 62/201 |
| 6,418,737 B1 | * | 7/2002 | Kuroki et al. | ............... 62/156 |
| 6,467,288 B1 | * | 10/2002 | Kuroki et al. | ............... 62/197 |
| 6,467,289 B1 | * | 10/2002 | Kuroki et al. | ............... 62/201 |
| 6,601,773 B1 | * | 8/2003 | Saitoh et al. | ............... 237/2 B |
| 6,627,858 B1 | * | 9/2003 | Nomura et al. | ............... 219/492 |
| 6,827,091 B1 | * | 12/2004 | Harrison | ............... 134/22.18 |
| 6,837,443 B1 | * | 1/2005 | Saitoh et al. | ............... 237/2 B |

FOREIGN PATENT DOCUMENTS

| | | | |
|---|---|---|---|
| JP | 2001-336822 A | * | 12/2001 |
| JP | 2002-48397 A | * | 2/2002 |
| JP | 2002-147846 A | * | 5/2002 |
| JP | 2002-235953 A | * | 8/2002 |
| JP | 2003-56908 A | * | 2/2003 |

* cited by examiner

*Primary Examiner*—Mohammaed M. Ali
(74) *Attorney, Agent, or Firm*—Harness, Dickey & Pierce, PLC

(57) ABSTRACT

When heating up the water in the lower inner part of a hot water tank by a heat pump unit, a control unit stops the heat-up operation while leaving the hot water in an amount corresponding to the residual water capacity in the hot water tank detected by water level thermistors. In the heat-up operation in the hot water tank, the residual hot water capacity in the tank is first detected, then the heat-up operation is stopped when the residual hot water reaches an amount corresponding to the detected residual hot water capacity. At this point, the hot water is stored so that the hot water newly heated up by the heat pump unit is laid above the residual hot water for the preceding day. Consequently, the reduction in the operating efficiency of the heat pump cycle is prevented without supplying the medium-temperature residual hot water to a condenser.

10 Claims, 3 Drawing Sheets

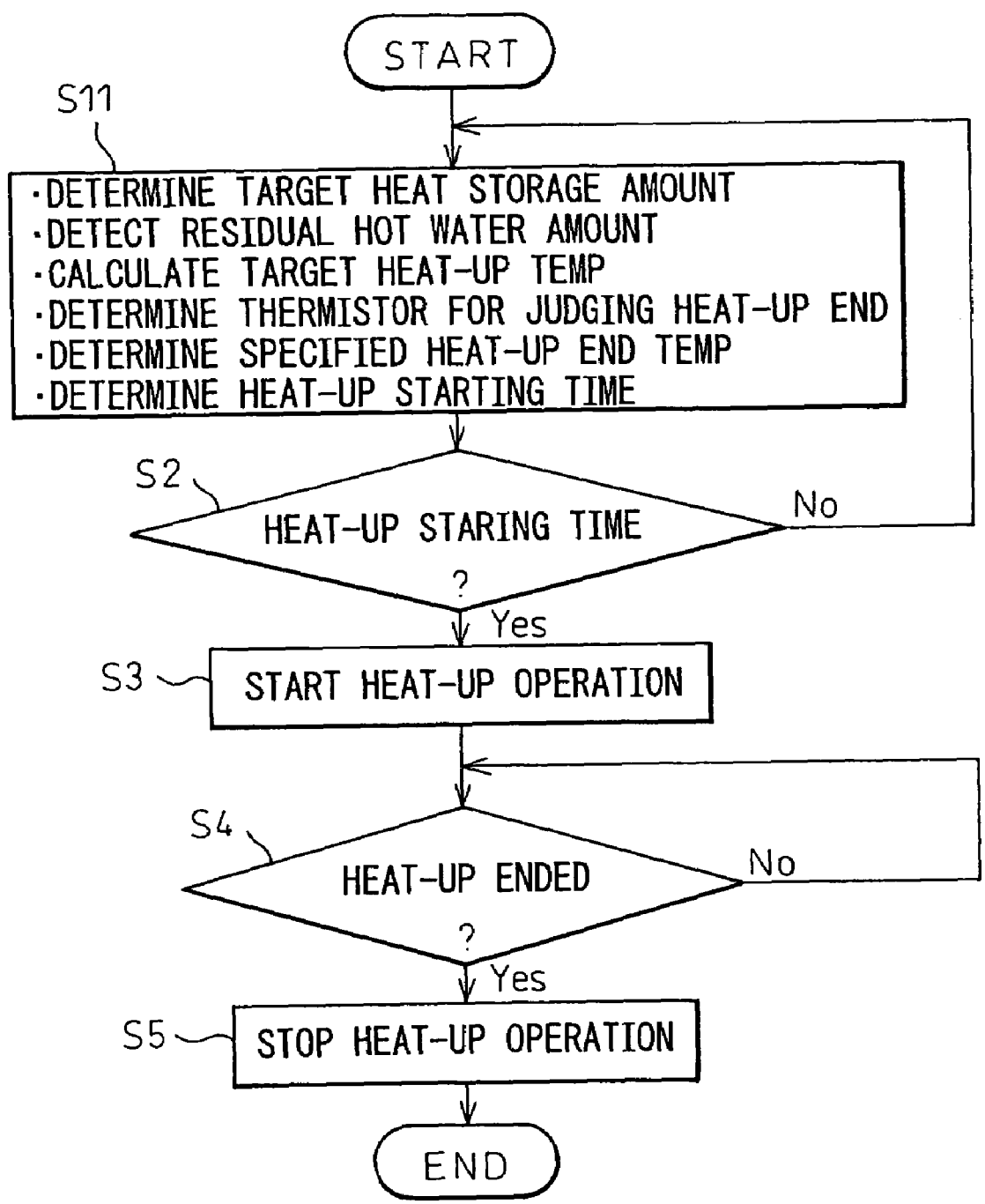

HEAT PUMP HOT WATER SUPPLY SYSTEM OF HOT WATER STORAGE TYPE

BACKGROUND OF THE INVENTION

1. Field of the Invention

The present invention relates to a heat pump hot water supply system of a hot water storage type to store the hot water heated by a heat pump in a hot water tank or, in particular, to a control operation for heating up the water in the hot water tank.

2. Description of the Related Art

A conventional heat pump hot water supply system of the above type comprises a hot water tank for storing the hot water to be supplied, a circulation water path for sending the water in the lower inner part to the upper inner part of the hot water tank, a heat pump unit arranged in the circulation water path to heat the water flowing in the circulation water path to a high temperature, a high-temperature hot water path led out from the upper part of the hot water tank to supply the high-temperature hot water stored in the upper inner part of the hot water tank whenever required by an external device, a medium-temperature hot water path led out from the middle part of the hot water tank to supply the medium-temperature hot water stored between the high-temperature water in the upper inner part of the hot water tank and the water in the lower inner part of the hot water tank whenever required to an external device, a water supply path for replenishing water to the lower inner part of the hot water tank when the hot water in the hot water tank is supplied to an external device through any one of the hot water paths, a plurality of stored hot water temperature detection means arranged along the height of the hot water tank for detecting the amount and temperature of the hot water stored in the hot water tank, and a control means for controlling the operation of the aforementioned components.

In the conventional heat pump hot water supply system of hot water storage type, the heat-up control operation is performed by heating up the whole amount of the hot water in the hot water tank including the residual hot water for the preceding data to a target hot water temperature during the midnight time zone. In the last stage of the heat-up operation, therefore, residual hot water higher in temperature than that of water is supplied to and heated in the heat pump unit. However, there is caused a problem in this heat pump hot water supply system, wherein the lower the temperature of the water supplied to a condenser for heating the water in a refrigeration cycle (heat pump cycle), the higher an operating efficiency (COP). Therefore, with the increase in the temperature of the water supplied to the condenser representing most of the residual medium-temperature hot water, the operating efficiency of the heat pump cycle is undesirably reduced.

SUMMARY OF THE INVENTION

This invention has been achieved in view of the problem of the prior art described above, and the object of the invention is to provide a heat pump hot water supply system of hot water storage type in which the operating efficiency is prevented from decreasing while carrying out the heat-up operation with the hot water remaining in the hot water tank.

In order to achieve the object described above, the technical means of the first to ninth aspects of the invention are employed.

Specifically, according to a first aspect of the invention, there is provided a heat pump hot water supply system of a hot water storage type, comprising a hot water tank (1) for storing the hot water to be supplied, a circulation water path (16) for sending the water in the lower inner part of the hot water tank (1) to the upper inner part of the hot water tank (1), a heat pump unit (2) arranged in the circulation water path (16) to heat the water flowing in the circulation water path (16) to a high-temperature, a high-temperature hot water path (12) led out from the upper part of the hot water tank (1) to supply the high-temperature hot water stored in the upper inner part of the hot water tank (1) to an external device whenever required by the external device, a water supply path (11) for replenishing water to the lower inner part of the hot water tank when the hot water in the hot water tank (1) is supplied to the external device through the high-temperature hot water path (12), a plurality of stored hot water temperature detection means (21a to 21e) arranged along the height of the hot water tank (1) for detecting the amount and temperature of the hot water stored in the hot water tank (1), and a control means (22) for controlling the operation of the aforementioned components, wherein in the case where the water in the lower inner part of the hot water tank (1) is heated up by the heat pump unit (2), the control means (22) stops the heat-up operation while leaving the hot water in an amount corresponding to the amount of the residual hot water in the hot water tank (1) detected by a predetermined one of the stored hot water temperature detection means (21a to 21e).

In the first aspect of the invention, while the water in the hot water tank (1) is heated up, the residual hot water capacity (W1) in the hot water tank (1) is detected and then the heat-up operation is stopped with the hot water left in an amount corresponding to the residual hot water capacity (W1) detected. Under this condition, the hot water heated up anew by the heat pump unit (2) stays in a layer above the hot water remaining from the preceding day. As a result, the residual medium-temperature hot water is not supplied to a condenser and therefore the operating efficiency of the heat pump cycle is prevented from being deteriorated.

According to a second aspect of the invention, there is provided a heat pump hot water supply system of hot water storage type, wherein the control means (22) estimates the temperature gradient between the stored hot water temperature detection means (21a to 21e) from each detection temperature of the stored hot water temperature detection means (21a to 21e) and calculates the residual hot water capacity (W1) from the estimated result.

In this aspect of the invention, the residual hot water capacity (W1) in the hot water tank (1) is detected not roughly by the position and the detection temperature alone of each stored hot water temperature detection means (21a to 21e) but intended to be more accurately detected by calculating the temperature gradient between the stored hot water temperature detection means (21a to 21e) by linear interpolation from each detection temperature. As a result, the heat-up operation in a more accurate amount is made possible and can be stopped accurately without supplying the residual hot water to the condenser.

According to a third aspect of the invention, there is provided a heat pump hot water supply system of a hot water storage type, wherein the control means (22) is adapted to stop the heat-up operation upon the lapse of a predetermined required heat-up time length (tn) calculated from the heating capacity of the heat pump unit (2). The amount of water to be heated up (W2) can be accurately calculated by detecting the residual hot water capacity (W1) accurately and subtracting it from the total capacity (W0) of the hot water tank (1). Thus, the time required to heat up the water amount (W2) to a target heat amount with a predetermined heating capacity is also easily calculated. By stopping the heat-up operation by controlling the time as in the third aspect of the invention, the operating efficiency of the heat pump cycle is prevented from being deteriorated without supplying the medium-temperature residual hot water to the condenser.

According to a fourth aspect of the invention, there is provided a heat pump hot water supply system of a hot water storage type, wherein the control means (22) stops the heat-up operation by detecting, by a predetermined one of the stored hot water temperature detection means (21a to 21e), a specified heat-up temperature (Tdb) based on the target heat-up temperature (TO) in the heat pump unit (2).

In this fourth aspect of the invention, the operating efficiency of the heat pump cycle is prevented from being deteriorated without supplying the medium-temperature residual hot water to the condenser also by stopping the heat-up operation upon detection that a predetermined temperature is reached at a position corresponding to the heat-up water amount (W2).

According to a fifth aspect of the invention, there is provided a heat pump hot water supply system of a hot water storage type, wherein the control means (22) stops the heat-up operation upon detection of a specified heat-up temperature (Tdb) by a predetermined one of the stored hot water temperature detection means (21a to 21e) based on the temperature detected, at the time of starting the heat-up operation, by the stored hot water temperature detection means (21a to 21e) in the neighborhood of the boundary layer between hot water and water.

In the fifth aspect of the invention, the heat-up operation is stopped upon detection, by a predetermined one of the stored hot water temperature detection means (21a to 21e) in the lower part of the hot water tank (1) (i.e. at the position corresponding to the heat-up water amount (W2) plus the residual hot water capacity (W1)), of a specified temperature (Tdb) (i.e. the temperature corresponding to the lower end of the residual hot water capacity (W1)), based on the detection value of the stored hot water temperature detection means (21a to 21e) in the neighborhood of the boundary layer between hot water and water at the time of starting the heat-up operation. Also in this way, the operating efficiency of the heat pump cycle is prevented from being deteriorated without supplying the medium-temperature residual hot water to the condenser.

According to a sixth aspect of the invention, there is provided a heat pump hot water supply system of a hot water storage type, wherein the control means (22) determines a target heat storage amount (QO) in the hot water tank (1) from the past hot water supply history and selects one of the stored hot water temperature detection means (21a to 21e) for detecting the specified heat-up temperature (Tdb), that is to say, judging the heat-up completion in accordance with the target heat storage amount (QO).

In this sixth aspect of the invention, one of the stored hot water temperature detection means (21a to 21e) is selected in the neighborhood of the position corresponding to the heat-up water amount (W2) or the heat-up water amount (W2) plus the residual hot water capacity (W1) in accordance with the target heat storage amount (WO).

According to a seventh aspect of the invention, there is provided a heat pump hot water supply system of a hot water storage type wherein, in the case where the target heat storage amount (QO) is large, the specified residual hot water temperature (Tdr) for judging the residual hot water capacity (W1) from each detection temperature of the stored hot water temperature detection means (21a to 21e) is changed upward.

In this seventh aspect of the invention, in the case where the target heat storage amount (QO) is so large that is cannot be attained even by heating up the heat-up water amount (W2) at the maximum heat-up temperature, the daytime heat-up operation time would be increased if no preventive measure is taken. Taking into account the reduction in the operating efficiency of the heat-up operation due to the rise of the temperature of the supplied hot water and the difference in electricity charge between daylight and night time, therefore, the specified residual hot water temperature (Tdr) can be changed upward thereby to underestimate the amount of the residual hot water capacity (W1).

According to an eighth aspect of the invention, there is provided a heat pump hot water supply system of a hot water storage type, wherein in the case where the target heat storage amount (QO) is large, the specified heat-up temperature (Tdb) detected by a predetermined one of the stored hot water temperature detection means (21a to 21e) is changed upward.

In this eighth aspect of the invention, in the case where the target heat storage amount (Q0) is so large that it cannot be attained even by heating up the heat-up water amount (W2) at the maximum heat-up temperature, the daytime heat-up operation time would be increased if no preventive measure is taken. In view of this, taking the reduction in the operating efficiency of the heat-up operation due to the rise in the temperature of the supplied water and the difference in electricity charge between daytime and nighttime, the specified heat-up temperature (Tdb) is changed upward to facilitate the attainment of the target temperature.

According to a ninth aspect of the invention, there is provided a heat pump hot water supply system of a hot water storage type, further comprising a medium-temperature hot water supply path (13) led from about the middle part of the hot water tank (1) for supplying to an external device the medium-temperature hot water stored between the high-temperature hot water in the upper inner part of the hot water tank (1) and the water in the lower inner part of the hot water tank (1), wherein in the case where the hot water in the hot water tank (1) is required by the external device, the medium-temperature hot water is delivered before the high-temperature hot water stored in the upper inner part of the hot water tank (1).

Specifically, the hot water remaining from the preceding day is used before the other hot water by delivering the medium-temperature hot water from the medium-temperature hot water supply path (13) before the high-temperature water supply path (12) in the upper part of the hot water tank (1) in the case where the hot water exists from the middle to lower part of the hot water tank (1).

In this ninth aspect of the invention, the residual hot water decreased in temperature by radiation is consumed before the other hot water and, therefore, the temperature of the residual hot water for the day can be increased thereby to increase the heat storage amount in the hot water tank (1) for the next day. Specifically, the amount of heat that can be stored during the midnight power supply service time zone is increased, and therefore the additional heat-up operation during the expensive daytime power supply time zone is minimized thereby to decrease the maintenance cost.

According to a tenth aspect of the invention, there is provided a heat pump hot water supply system of a hot water storage type, wherein the control means (22) heats up only the required amount of hot water in the hot water tank (1) in the case where the target heat storage amount (QO) is small, and also delivers a mixture of the hot water from the medium-temperature hot water supply path (13) and the hot water from the high-temperature hot water supply path (12) in the case where the hot water from the medium-temperature hot water supply path (13) fails to reach the delivery temperature.

In the tenth aspect of the invention, the hot water tank (1) may not be heated up to the total capacity thereof in the case where the target heat storage amount (QO) is small. In such a case, therefore, water is kept passing through the medium-temperature hot water supply path (13) to make sure that water passes through the hot water tank (1) each time the hot water is delivered. By doing so, the same hot water is prevented from staying for a long time in the lower part of the hot water tank (1).

Incidentally, the reference numerals in parentheses, to denote the above means, are intended to show the relationship of the specific means which will be described later in an embodiment of the invention.

The present invention may be more fully understood from the description of preferred embodiments of the invention set forth below, together with the accompanying drawings.

BRIEF DESCRIPTION OF THE DRAWINGS

FIG. 3 is a flowchart showing the process of controlling the heat-up operation of the control unit 22 according to second and third embodiments of the invention.

DESCRIPTION OF THE PREFERRED EMBODIMENTS

Figure 1:
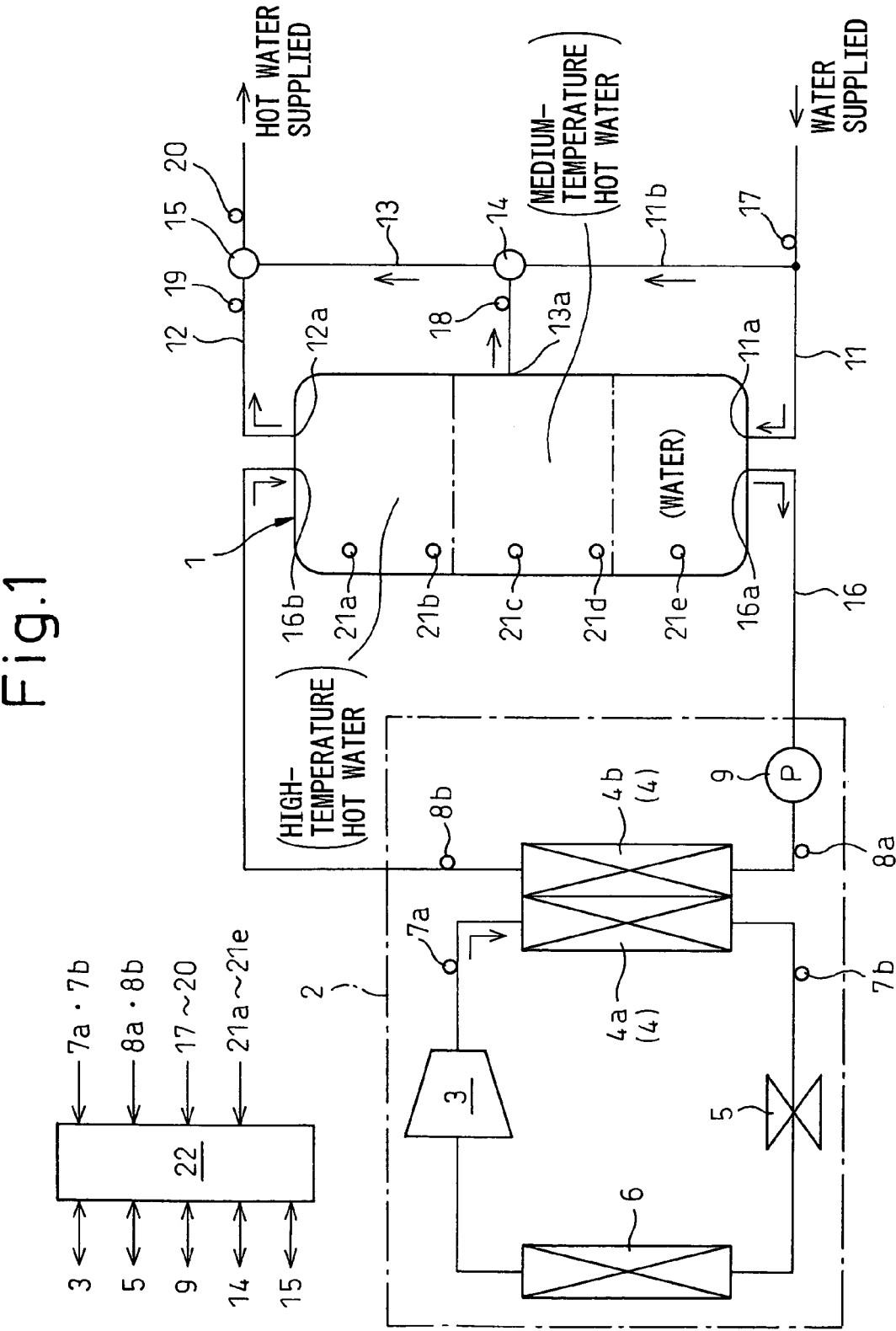
FIG. 1 is a schematic diagram showing the component elements of a heat pump hot water supply system of hot water storage type according to an embodiment of the invention.

Embodiments of the invention are explained below with reference to the accompanying drawings. First, reference is made to a first embodiment. FIG. 1 is a schematic diagram showing a general configuration of a heat pump hot water supply system of hot water storage type according to an embodiment of the invention. As shown in FIG. 1, the heat pump hot water supply system of hot water storage type according to this embodiment roughly comprises a hot water tank 1 for storing the hot water to be supplied, a circulation water path 16 for sending the water in the lower inner part of the hot water tank 1 to the upper inner part of the hot water tank 1, and a heat pump unit 2 arranged in the circulation water path 16 for heating the water flowing in the circulation water path 16 to high-temperature hot water.

The hot water tank 1 is connected with a high-temperature hot water supply path 12 led out from the upper part of the hot water tank 1 to supply the high-temperature hot water stored in the upper inner part of the hot water tank 1 to an external device when the hot water in the hot water tank 1 is required by the external device, a medium-temperature hot water supply path 13 led out from the middle part of the hot water tank to supply the medium-temperature hot water stored between the high-temperature hot water in the upper inner part of the hot water tank 1 and the water in the lower inner part of the hot water tank 1 to an external device when the hot water in the hot water tank 1 is required by the external device, and a water supply path 11 for replenishing water to the lower inner part of the hot water tank 1 when the hot water in the hot water tank 1 is supplied to an external device through any one of the hot water supply paths 12 and 13.

The hot water tank 1 also includes a plurality of water level sensors (stored hot water temperature detection means) 21a to 21e arranged along the height of the hot water tank 1 for detecting the amount and temperature of the hot water in the hot water tank 1 and a control unit (control means) 22 for controlling the operation of these components.

The hot water tank 1 is made of a metal (such as stainless steel) high in corrosion resistance and having an insulating member, not shown, arranged on the outer periphery thereof, capable of retaining the heat of the high-temperature hot water for a long time. The hot water tank 1 is formed as a vertically long rectangle and has a water inlet 11a in the bottom thereof. This water inlet 11a is connected with a water path 11 for leading the tap water into the lowest inner part of the hot water tank 1.

The water path 11 includes therein a water thermistor 17 providing a temperature detection means which outputs the information on the temperature in the water path 11 to a control unit 22 described later. Also, the water path 11 includes a reduction valve, not shown, for regulating the pressure of the tap water led into the water path 11 at a predetermined level. The part of the water path 11 downstream of the water thermistor 17 and the reduction valve is connected with a mixing valve 14 through a bypass 11b.

A high-temperature hot water outlet 12a is formed in the uppermost part of the hot water tank 1, and a high-temperature water path 12 for leading the high-temperature hot water stored in the upper inner part of the hot water tank 1 is connected to the high-temperature hot water outlet 12a. A medium-temperature hot water outlet 13a providing an upstream end portion of the hot water path is arranged on the middle part of the side surface of the hot water tank 1. A medium-temperature hot water path 13, which leads the medium-temperature hot water stored between the high-temperature hot water in the upper inner part of the hot water tank 1 and the water in the lower inner part of the hot water tank 1 to an external device, is connected with the medium-temperature hot water outlet 13a.

The medium-temperature hot water path 13 has arranged therein a first mixing valve 14 for mixing the tap water supplied from the bypass 11b and the medium-temperature hot water led out of the medium-temperature hot water outlet 13a to a predetermined temperature. The outlet of the first mixing valve 14 is connected to communicate with one of the inlets of a second mixing valve 15 described later and is controlled by the control unit 22 described later. A medium-temperature thermistor 18 providing a temperature detection means is arranged between the first mixing valve 14 and the medium-temperature hot water outlet 13a, so that the temperature information on the medium-temperature hot water led out of the medium-temperature hot water outlet 13a is output to the control unit 22.

The second mixing valve 15 is a temperature regulation valve for regulating the temperature of the hot water supplied to a hot water cock not shown, and arranged at the confluence of the bypass 11b, the first mixing valve 14, the medium-temperature hot water path 13 and the high-temperature hot water path 12. The mixing ratio between the hot water from the high-temperature hot water path 12 and the hot water from the medium-temperature hot water path 13 or the tap water from the bypass 11b can be adjusted by adjusting the open area ratio of the second mixing valve 15.

A high-temperature thermistor 19 providing a temperature detection means is arranged between the second mixing valve 15 and the high-temperature hot water outlet 12a. Thus, the temperature information on the high-temperature hot water led out of the high-temperature hot water outlet 12a is output to the control unit 22 described later. A hot water thermistor 20 providing a temperature detection means is arranged downstream of the second mixing valve 15, so that the temperature information on the hot water supplied from the second mixing valve 15 is output to the control unit 22.

The outlet side of the high-temperature hot water mixing valve 15 communicates with a hot water cock, a shower, a bath tab water cock, not shown, of a kitchen, a toilet room, etc. The first mixing valve 14 and the second mixing valve 15 are both an electrically-operated valve with the valve body thereof driven by a drive source such as a servo motor for adjusting the opening of each path. These valves operate in response to a control signal from the control unit 22 described later, and the operating conditions of these valves are output to the control unit 22.

An intake port 16a for sucking in water from the lowest inner part of the hot water tank 1 is arranged at the lower part of the hot water tank 1. A discharge port 16b for discharging the hot water into the uppermost inner part of the hot water tank 1 is arranged at the upper part of the hot water tank 1. The intake port 16a and the discharge port 16b are connected to each other by the circulation water path 16, and a part of the circulation water path 16 is arranged in the heat pump unit 2.

The heat pump unit 2 is configured of a heat pump cycle using carbon dioxide ($CO_2$) having a low critical temperature as a refrigerant, a circulation water path 16 for circulating the water from the lower part of the hot water tank 1 and returning the water heated by the heat pump cycle to the upper part of the hot water tank 1, and a water supply pump 9 arranged in the circulation water path 16. A supercritical heat pump can store a hot water higher in temperature (say, about 85 to 90° C.) than the ordinary heat pump cycle in the hot water tank 1. The heat pump unit 2 is operated by a control signal from the control unit 22, and the operating conditions of the heat pump unit 2 are output to the control unit 22.

The heat pump cycle is configured of an electrically-operated compressor 3, a water-refrigerant heat exchanger 4, an electrical expansion valve 5 and an air heat exchanger 6 connected in that order by a refrigerant pipe. The compressor 3 is a motor-driven refrigerant compressor rotationally driven by a built-in electric motor, not shown, in such a manner that the refrigerant sucked in from the air heat exchanger 6 is compressed to a higher pressure than the critical pressure and discharged.

Using the AC power supplied in the midnight power supply service time zone as the cheapest power source, the heat regenerative operation is performed to heat up the hot water in the hot water tank 1. Nevertheless, the heat-up operation is conducted also in the daytime whenever the temperature of the hot water in the uppermost inner part of the hot water tank 1 drops. The rotational speed of the compressor 3 is controlled by the control unit 22 so as to exhibit a specified capacity under various operating conditions. The electrical expansion valve 5 is a device for reducing the pressure of the high-pressure refrigerant flowing out of the water-refrigerant heat exchanger 4 and the valve opening degree thereof is electrically controlled by the control unit 22.

In the air heat exchanger 6, the refrigerant reduced in pressure by the electrical expansion valve 5 is evaporated by exchanging heat with the outdoor air supplied thereto by a fan, not shown, for the air heat exchanger and the gas refrigerant is supplied to the compressor 3. The rotational speed of the fan is controlled by the control unit 22 in such a manner as to secure the heat exchange performance of the air heat exchanger 6.

The water-refrigerant heat exchanger 4 is for turning water to hot water by increasing the temperature thereof through the high-pressure high-temperature refrigerant discharged from the discharge port of the compressor 3. The refrigerant-side heat exchanger 4a in the water-refrigerant heat exchanger 4 is configured of a refrigerant pipe for exchanging heat between the hot water and the high-pressure gas refrigerant discharged from the discharge port of the compressor 3. The water-refrigerant heat exchanger 4 has a double-layer structure in which a first end surface of the refrigerant-side heat exchanger 4a is closely attached to a second end surface of the water-side heat exchanger 4b in a way permitting heat exchange.

The hot water supply heat exchanger 4b is so configured that heat is exchanged between the refrigerant and the hot water over the entire length of the refrigerant path leading from the refrigerant inlet to the refrigerant outlet of the refrigerant-side heat exchanger 4a. According to this configuration, a specified heat exchange performance is exhibited in the case where the hot water corresponding to the hot water temperature (about 65 to 90° C.) is recovered from the outlet of the water-side heat exchanger 4b. The circulation water path 16 is a circulation line configured of the water-side heat exchanger (heat source) 4b in the water-refrigerant heat exchanger 4, the hot water tank 1 and the water pump 9 connected in that order by a hot water storage pipe.

The water pump 9 is arranged midway of the circulation water path 16 and is rotationally driven by a built-in electric motor, not shown. This water pump 9 operates in such a manner that the hot water heated in the water-side heat exchanger 4b is refluxed to the hot water tank 1 during the heat-up operation. The rotational speed of the water pump 9 is controlled by the control unit 22 in such a way that the water temperature at the outlet of the water-side heat exchanger 4b reaches a target heat-up temperature predetermined under various operating conditions.

Reference numeral 7a designates a discharged refrigerant temperature thermistor for detecting the temperature of the refrigerant discharged from the compressor 3, and numeral 7b an outlet refrigerant temperature thermistor for detecting the refrigerant temperature at the outlet of the water-refrigerant heat exchanger 4 (refrigerant-side heat exchanger 4a). Numeral 8a designates an influent water temperature thermistor for detecting the temperature of the water supplied to the water-refrigerant heat exchanger 4 (water-side heat exchanger 4b). Numeral 8b designates a heat-up temperature thermistor for detecting the heat-up temperature at the outlet of the water-refrigerant heat exchanger 4 (water-side heat exchanger 4b). These thermistors all output the temperature gradient to the control unit 22.

A plurality (five in the shown case) of water level thermistors 21a to 21e providing stored hot water temperature detection means for detecting the amount and temperature of the stored hot water are arranged substantially equidistantly in vertical direction (along the height of the hot water tank 1) on the outer wall surface of the hot water tank 1. The water level thermistors 21a to 21e output the information on the temperature at each water level of the hot water or the water filled in the hot water tank 1 to the control unit 22 described later. Thus, the control unit 22, based on the temperature information from the water level thermistors 21a to 21e, can detect the boundary position between the water heated up in the upper inner part of the hot water tank 1 and the water yet to be heated up in the lower inner part of the hot water tank 1 and thereby can detect the stored hot water amount.

The water level thermistor 21a is arranged on the outer wall surface at the uppermost part of the hot water tank 1 and has also the function of a hot water delivery thermistor to detect the temperature of the hot water in the uppermost inner part of the hot water tank 1 which is equal to the temperature of the high-temperature hot water taken into the high-temperature hot water outlet 12a. The water level thermistor 21c is arranged substantially flush with the medium-temperature hot water outlet 13a described above. As a result, the water level thermistor 21c has also the function of a hot water delivery thermistor for detecting the temperature of the hot water led out of the medium-temperature hot water outlet 13a.

Reference numeral 22 designates a control unit providing a control means for controlling the heat pump unit 2, the first mixing valve 14 and the second mixing valve 15 based on the temperature information from the thermistors 17 to 20, 21a to 21e and the signals from the operating switch on a control panel not shown. The control panel not shown is arranged in the neighborhood of a place where hot water is used, in the bathroom, in the kitchen, etc. Other parts than the control panel are installed at appropriate places including outdoor points.

The operation of the heat pump hot water supply system of hot water storage type having the configuration described above is explained. In the case where the power switch, not shown, for the hot water supply system is turned on, the control unit 22, based on the temperature information from the thermistors arranged in the hot water tank 1 or the time information set by the control panel not shown, starts the heat pump unit 2 appropriately and heats the water in the hot water tank 1 to high-temperature hot water (of, say, about 85° C.).

Figure 2:
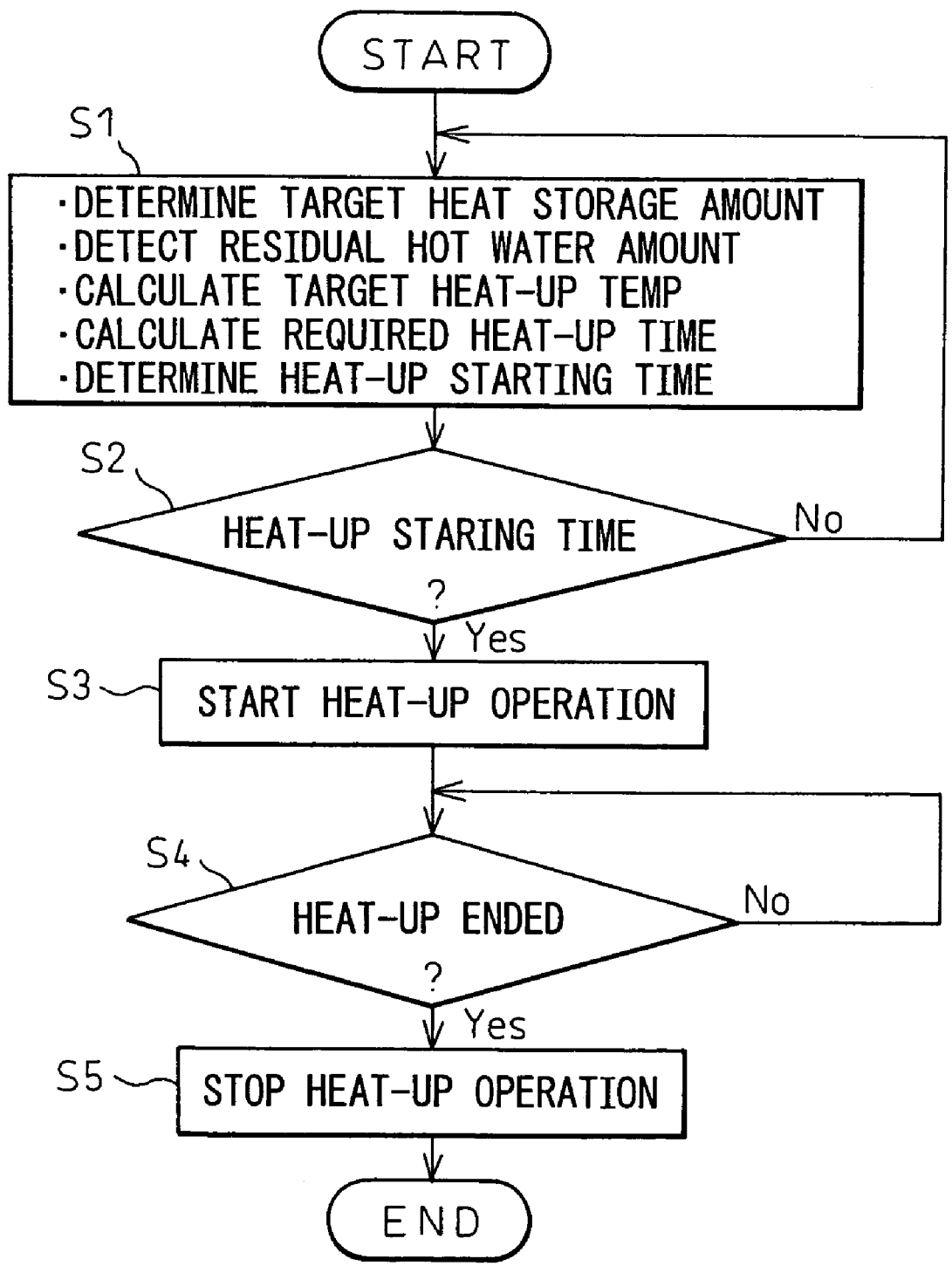
FIG. 2 is a flowchart showing the process of controlling the heat-up operation of the control unit 22 according to a first embodiment of the invention.

FIG. 2 is a flowchart showing the process of controlling the heat-up operation of the control unit 22 according to the first embodiment of the invention. In the heat pump hot water supply system of hot water storage type according to this embodiment, as soon as the midnight power supply service time zone is entered or otherwise a state permitting the heat-up operation arrives, it first executes step 1 to determine a target heat storage amount Q0 from the past hot water supply history, etc. At the same time, the amount and temperature of the hot water remaining (residual hot water amount W1 and the residual hot water temperature) in the hot water tank 1 at the particular time point are detected by the water level sensors 21a to 21e, and from the detection values thereof, the amount of heat Q1 of the residual hot water is calculated.

The heat amount Q1 of the residual hot water is subtracted from the target heat storage amount Q0 already determined thereby to determine the heat-up target heat amount Q2. Also, the residual hot water amount W0 is subtracted from the total capacity W0 of the hot water tank 1 to calculate the heat-up water amount W2. The target heat amount Q2 is divided by the heat-up water amount W2, and the water temperature is added to the quotient thereby to calculate the target heat-up temperature T0. The required heat-up time tn is calculated to heat up the heat-up water amount W2 at the current water temperature to the target heat-up temperature T0 by the heating capacity of the heat pump unit 2. The actual heat-up starting time is determined by inverse-calculating the required heat-up time tn in such a manner that the heat-up operation is completed at the end of the midnight power supply service time zone when low-cost power is available.

Next, step S2 judges whether the heat-up starting time has arrived or not. In the case where the result is NO indicating that the heat-up starting time has not yet arrived, steps 1 and 2 are repeated to recalculate the heat-up operating conditions, while awaiting the heat-up starting time. Once the judgment in step S2 turns YES indicating that the heat-up starting time has arrived, the process proceeds to step S3 thereby to start the heat-up operation. In step S4, the heat-up operation is continued until the conditions for terminating the heat-up operation come to be met. According to this embodiment, upon the lapse of the required heat-up time tn calculated in step S1, the process proceeds to step S5 where the heat-up operation is stopped.

The features of this embodiment will be described. First, the control unit 22, after heating up the water in the lower inner part of the hot water tank 1 by the heat pump unit 2, stops the heat-up operation while leaving the hot water amount corresponding to the residual hot water capacity W1 in the hot water tank 1 detected by the water level sensors 21a to 21e. In this way, the water in the hot water tank 1 is heated up in such a manner that the residual hot water capacity W1 in the hot water tank 1 is detected after which the heat-up operation is continued until, and stopped when, the hot water remains in an amount corresponding to the detected residual hot water capacity W1. At this time point, the hot water is stored in such layers that the hot water heated up anew by the heat pump unit 2 is laid above the hot water remaining from the preceding day. As a result, the medium-temperature residual hot water is not supplied to the condenser and the operating efficiency of the heat pump cycle is prevented from being deteriorated.

The control unit 22 estimates the temperature gradient between the water level sensors 21a to 21e from each detected temperature of the water level sensors 21a to 21e, and the result of estimation is used to calculate the residual hot water capacity W1. The residual hot water capacity W1 is not roughly determined by the position and the detected temperature alone of the water level sensors 21a to 21e. Instead, the temperature gradient between the water level sensors 21a to 21e is calculated by linear interpolation from each detected temperature of the water level sensors 21a to 21e thereby to accurately calculate the residual hot water capacity W1 in the hot water tank 1. In this way, the heat-up operation with higher accuracy is made possible while at the same time making it possible to stop the heat-up operation more accurately in a way which will not supply the residual hot water to the condenser.

The control unit 22 stops the heat-up operation upon the lapse of the required heat-up time tn calculated from the heating capacity of the heat pump unit 2. The heat-up water amount W2 can be accurately calculated by accurately detecting the residual hot water capacity W1 and subtracting it from the total capacity W0 of the hot water tank 1. It is therefore easy to calculate the time required to heat up the water amount W2 to the target heat amount by a predetermined heating capacity. Also in the case where the time is controlled to stop the heat-up operation, therefore, the medium-temperature residual hot water is not supplied to the condenser and the operating efficiency of the heat pump cycle can be prevented from being deteriorated. In order to secure the heating capacity of the heat pump unit 2, the rotational speed of the compressor 3 is determined by the atmospheric temperature and the refrigerant evaporation temperature of the air heat exchanger 6.

Also, in order to supply the medium-temperature hot water stored between the high-temperature hot water in the upper inner part of the hot water tank 1 and the water in the lower inner part of the hot water tank 1 to an external device, the system comprises a medium-temperature hot water path 13 led out from the middle part of the hot water tank 1. Also, in the case where the external device requires the hot water in the hot water tank 1, the medium-temperature hot water is delivered before the high-temperature hot water stored in the upper inner part of the hot water tank 1.

The residual hot water from the preceding day is used before the other hot water. In the case where hot water remains in the middle to lower inner parts of the hot water tank 1, therefore, the hot water is delivered from the medium-temperature hot water path 13 at the middle part in advance of the high-temperature hot water path 12 in the upper inner part of the hot water tank 1. This prior consumption of the residual hot water reduced in temperature by radiation makes it possible to increase the temperature of the residual hot water for the day thereby leading to an improved heat storage amount of the hot water tank 1 for the next day. In other words, the heat amount stored during the midnight power supply service time zone is increased to such a degree that the additional heat-up operation during the expensive daytime power supply time zone can be minimized. As a result, the maintenance cost is kept low.

The control unit 22 so operates that in the case where the target heat storage amount $Q_0$ is small, only the required amount is heated up in the hot water tank 1, while, in the case where the hot water from the medium-temperature hot water path 13 fails to reach the hot water delivery temperature, on the other hand, the hot water from the medium-temperature water path 13 and the hot water from the high-temperature hot water path 12 are mixed with each other and delivered. In the case where the target heat storage amount $Q_0$ is small, the whole amount in the hot water tank 1 may not be heated up, and therefore water is kept passing through the medium-temperature hot water path 13 to make sure that water passes through the hot water tank 1 each time hot water is delivered. By doing so, the same hot water is prevented from staying for a long time in the lower inner part of the hot water tank 1.

Next, the second embodiment of the invention is explained. FIG. 3 is a flowchart showing the process of controlling the heat-up operation of the control unit 22 according to the second and third embodiments of the invention. The second embodiment is different from the first embodiment only in that step S1 is replaced with step S11, and the other steps are identical to the corresponding steps of the first embodiment (FIG. 2). First, the target heat amount $Q_0$ is determined from the past history of hot water supply in step S1. At the same time, the present residual hot water capacity (the residual hot water amount $W_1$ and the residual hot water temperature) in the hot water tank 1 is detected by the water level sensors 21a to 21e and, from this detected value, the heat amount $Q_1$ of the residual hot water is calculated. The heat amount obtained by subtracting the residual hot water heat amount $Q_1$ from the target storage heat amount $Q_0$ determined earlier is set as a heat-up target heat amount $Q_2$.

Also, the water amount obtained by subtracting the residual hot water amount $W_0$ from the total capacity $W_0$ of the hot water tank 1 is determined as a heat-up water amount $W_2$. The target heat amount $Q_2$ calculated earlier is divided by this heat-up water amount $W_2$ and the quotient is added to the water supply temperature thereby to calculate the target heat-up temperature $T_0$. Next, one of the water level sensors 21a to 21e in the neighborhood of the position corresponding to the heat-up water amount $W_2$ calculated above is selected, while at the same time determining a specified heat-up temperature $T_{db}$ based on the target heat-up temperature $T_0$ for the heat pump unit detected by the particular water level sensor. In determining the actual heat-up starting time, the required heat-up time tn is calculated in the same manner as in the first embodiment. Specifically, the required heat-up time tn is inverse-calculated in such a manner that the heat-up operation is completed at the end of the low-cost midnight power supply service time zone.

Then, step S2 judges whether the heat-up starting time has arrived or not. In the case where the judgment is NO and the heat-up starting time has yet to arrive, steps S1 and S2 are repeated to recalculate the heat-up operating conditions, while waiting for the heat-up starting time. Once the judgment in step S2 turns to YES and the heat-up starting time has arrived, the process proceeds to step S3 to start the heat-up operation. In step S4, the heat-up operation is continued until the conditions for ending the heat-up operation are met. According to this embodiment, when the specified heat-up temperature $T_{db}$ determined in step S1 is detected by the water level sensor selected in step S1, the process proceeds to step S5 thereby to stop the heat-up operation.

The features of this embodiment are described. First, the control unit 22 stops the heat-up operation as soon as the specified heat-up temperature $T_{db}$ determined based on the target heat-up temperature $T_0$ in the heat pump unit 2 is detected by a predetermined one of the water level sensors 21a to 21e. Also in the case where the heat-up operation is stopped upon detection of a predetermined temperature at a position corresponding to the heat-up water amount $W_2$, the reduction in the operating efficiency of the heat pump cycle can be prevented without supplying the medium-temperature residual hot water to the condenser.

Also, the control unit 22 determines the target heat storage amount $Q_0$ in the hot water tank 1 from the past hot water supply history and selects one of the water level sensors 21a to 21e for detecting the specified heat-up temperature $T_{db}$ in accordance with the target heat storage amount $Q_0$, i.e. for judging the end of the heat-up operation. In this way, one of the water level sensors 21a to 21e in the neighborhood of a position corresponding to the heat-up water amount $W_2$ is selected in accordance with the target heat storage amount $Q_0$ in the manner described above.

In the case where the target heat storage amount $Q_0$ is large, the specified residual hot water temperature $T_{dr}$ for judging the residual hot water capacity $W_1$ from each detection temperature of the water level sensors 21a to 21e is changed upward. By so doing, in the case where the target heat storage amount $Q_0$ is so large that it cannot be attained even when the heat-up water amount $W_2$ is heated up at the maximum heat-up temperature, the daytime heat-up operation time would be lengthened if no preventive measure is taken. Taking the reduced operating efficiency of the heat-up operation due to the increased water temperature and the difference in electricity charge between daytime and midnight into consideration, the specified residual hot water temperature $T_{dr}$ can be changed upward thereby to estimate the residual hot water capacity $W_1$ moderately.

As an alternative, in the case where the target heat storage amount $Q_0$ is large, the specified heat-up temperature $T_{db}$ detected by a predetermined one of the water level sensors 21a to 21e is changed downward. By doing so, in the case where the target heat storage amount Q0 is so large that it cannot be attained even when the heat-up water amount W2 is heated up at the maximum heat-up temperature, the daytime heat-up operation time would be increased if no preventive measure is taken. Taking the reduced operating efficiency of the heat-up operation due to the increased water temperature and the difference in electricity charge between daytime and midnight into consideration, therefore, the specified heat-up temperature Tdb is changed upward thereby to facilitate achievement of the target temperature.

Now, a third embodiment of the invention is explained. FIG. 3 is a flowchart showing the process of controlling the heat-up operation of the control unit 22 according to the second and third embodiments of the invention. The third embodiment is different from the second embodiment only in the method of detecting the specified heat-up temperature Tdb.

Specifically, in the second embodiment described above, the heat-up operation is stopped upon detection of the arrival of the specified heat-up temperature Tdb (i.e. the temperature corresponding to the lower end of the newly heated up hot water) determined based on the target heat-up temperature T0 in the heat pump unit 2 at a position corresponding to the heat-up water amount W2. The third embodiment is different from the second embodiment only in that the heat-up operation is stopped upon detection of the specified heat-up temperature Tdb (i.e. the temperature corresponding to the lower end of the residual hot water capacity W1) determined based on the detection value of the water level sensors 21a to 21e in the neighborhood of the boundary layer between hot water and water in starting the heat-up operation at a position corresponding to the heat-up water amount W2 plus the residual hot water capacity W1.

The features of this embodiment are explained. First, the control unit 22 stops the heat-up operation upon detection, by a predetermined one of the water level sensors 21a to 21e, of the specified heat-up temperature Tdb determined based on the detection values of the water level sensors 21a to 21e in the neighborhood of the boundary layer between hot water and cold water at the time of starting the heat-up operation. In this case, the heat-up operation is stopped upon detection, by a predetermined one of the water level sensors 21a to 21e in the lower part of the hot water tank 1 (i.e. at the position corresponding to the heat-up water amount W2 plus the residual hot water capacity W1), of the specified temperature Tdb (i.e. the temperature corresponding to the lower end of the residual hot water capacity W1) based on the detection value of the water level sensors 21a to 21e in the neighborhood of the boundary layer between hot water and water in starting the heat-up operation. Also in this way, the reduction in the operating efficiency of the heat pump cycle can be prevented without supplying the medium-temperature residual hot water to the condenser.

Further, the control unit 22 determines the target heat storage amount Q0 in the hot water tank 1 from the past hot water supply history while, at the same time detecting the specified heat-up temperature Tdb and thus selecting one of the water level sensors 21a to 21e for judging the end of the heat-up operation in accordance with the target heat storage amount Q0. In this way, one of the water level sensors 21a to 21e in the neighborhood of a position corresponding to the heat-up water amount W2 plus the residual hot water capacity W1 is selected in accordance with the target heat storage amount Q0.

Finally, other embodiments are explained. Although the midnight power is used as a power supply of the heat pump unit 2 according to the aforementioned embodiments, the AC power supplied during the daytime may be used.

While the invention has been described by reference to specific embodiments chosen for purposes of illustration, it should be apparent that numerous modifications could be made thereto by those skilled in the art without departing from the basic concept and scope of the invention

What is claimed is:

1. A heat pump hot water supply system of a hot water storage type, comprising:
    a hot water tank (1) for storing therein the hot water to be supplied;
    a circulation water path (16) for sending the water in the lower inner part of said hot water tank (1) to the upper inner part of said hot water tank (1);
    a heat pump unit (2) arranged in said circulation water path (16) to heat the water flowing said the circulation water path (16) to high-temperature hot water;
    a high-temperature hot water path (12) led out from the upper part of said hot water tank (1) to supply the high-temperature hot water to an external device from the upper inner part of said hot water tank (1) whenever required by said external device;
    a water supply path (11) for replenishing water to the lower inner part of said hot water tank (1) when the hot water in said hot water tank (1) is supplied to the external device through said hot water path (12);
    a plurality of stored hot water temperature detection means (21a to 21e) arranged along the height of said hot water tank (1) to detect the amount and temperature of the hot water stored in said hot water tank (1); and
    a control means (22) for controlling the operation of said components,
    wherein in the case where the water in the lower inner part of said hot water tank (1) is heated up by said heat pump unit (2), said control means (22) stops said heat-up operation while leaving the hot water in an amount equivalent to the residual hot water capacity (W1) in said hot water tank (1) detected by said hot water temperature detection means (21a to 21e).

2. A heat pump hot water supply system of a hot water storage type according to claim 1,
    wherein said control means (22) estimates the temperature gradient between said stored hot water temperature detection means (21a to 21e) from each detection temperature of said stored hot water temperature detection means (21a to 21e) and calculates said residual hot water capacity (W1) based on said estimation.

3. A heat pump hot water supply system of a hot water storage type according to claim 1,
    wherein said control means (22) stops said heat-up operation upon the lapse of the required time length (tn) calculated from the heating capacity of said heat pump unit (2).

4. A heat pump hot water supply system of a hot water storage type according to claim 1,
    wherein said control means (22) stops said heat-up operation upon detection, by a predetermined one of said stored hot water temperature detection means (21a to 21e), of a specified heat-up temperature (Tdb), determined based on the target heat-up temperature (TO) of said heat pump unit (2).

5. A heat pump hot water supply system of a hot water storage type according to claim 1,
    wherein said control means (22) stops said heat-up operation upon detection, by a predetermined one of said stored hot water temperature detection means (21a to

21*e*), of the specified heat-up temperature (Tdb), based on the detection values of said stored hot water temperature detection means (21*a* to 21*e*) in the neighborhood of the boundary area between hot water and water at the time of starting said heat-up operation.

6. A heat pump hot water supply system of a hot water storage type according to claim 4, wherein said control means (22) determines a target storage heat amount (QO) in said hot water tank (1) based on the past hot water supply history and selects one of said stored hot water temperature detection means (21*a* to 21*e*) to detect said specified heat-up temperature (Tdb) in accordance with said target heat storage amount (QO).

7. A heat pump hot water supply system of a hot water storage type according to claim 4, wherein in the case where said target stored heat amount (QO) is large, said specified residual hot water temperature (Tdr) for judging said residual hot water capacity (W1) from each detection temperature of said stored hot water temperature detection means (21*a* to 21*e*) is changed upward.

8. A heat pump hot water supply system of a hot water storage type according to claim 4, wherein in the case where said target heat storage amount (QO) is large, said specified heat-up temperature (Tdb) detected by a predetermined one of said stored hot water temperature detection means (21*a* to 21*e*) is changed upward.

9. A heat pump hot water supply system of a hot water storage type according to claim 1, further comprising:

a medium-temperature hot water supply path (13) led from about midway in said hot water tank (1) to supply to an external device the medium-temperature hot water stored between the high-temperature water in the upper inner part of said hot water tank (1) and the water in the lower inner part of said hot water tank (1), wherein in the case where the hot water in said hot water tank (1) is required by said external device, said medium-temperature hot water is delivered before said high-temperature water stored in the upper inner part of said hot water tank (1).

10. A heat pump hot water supply system of hot water storage type according to claim 1, wherein in the case where said target stored heat amount (QO) is small, said control means (22) heats up only the required amount of the hot water in said hot water tank (1), and in the case where the hot water from said medium-temperature hot water supply path (13) fails to reach the delivery temperature, said control means (22) delivers a mixture of the hot water from said medium-temperature hot water supply path (13) and the hot water from said high-temperature hot water supply path (12).

\* \* \* \* \*